(12) United States Patent
Sasaki et al.

(10) Patent No.: US 7,497,397 B2
(45) Date of Patent: Mar. 3, 2009

(54) CARTRIDGE CASE AND INFORMATION RECORDING MEDIUM

(75) Inventors: Morimasa Sasaki, Tokyo (JP); Hiroshi Kaneda, Tokyo (JP); Chotaro Kouzu, Tokyo (JP)

(73) Assignee: TDK Corporation, Tokyo (JP)

( * ) Notice: Subject to any disclaimer, the term of this patent is extended or adjusted under 35 U.S.C. 154(b) by 472 days.

(21) Appl. No.: 11/167,127

(22) Filed: Jun. 28, 2005

(65) Prior Publication Data

US 2006/0169817 A1 Aug. 3, 2006

(30) Foreign Application Priority Data

Jun. 30, 2004 (JP) ............................. 2004-192732

(51) Int. Cl.
*G03B 23/02* (2006.01)
(52) U.S. Cl. .................................... 242/338.1; 360/132
(58) Field of Classification Search ............. 242/338.1, 242/348, 343; 360/132
See application file for complete search history.

(56) References Cited

U.S. PATENT DOCUMENTS

| | | | |
|---|---|---|---|
| 6,452,747 B1 * | 9/2002 | Johnson et al. | 360/132 |
| 6,702,216 B2 | 3/2004 | Shima et al. | |
| 2002/0158161 A1 * | 10/2002 | Morita et al. | 242/338.1 |
| 2005/0127224 A1 * | 6/2005 | Ishikawa | 242/338.1 |
| 2005/0127225 A1 * | 6/2005 | Ishihara | 242/338.1 |
| 2005/0145736 A1 * | 7/2005 | Hiraguchi | 242/338.1 |

FOREIGN PATENT DOCUMENTS

| JP | 2002-083481 | 3/2002 |
|---|---|---|
| JP | 2002-100148 | 4/2002 |
| JP | 2002-343058 | 11/2002 |
| JP | 2002-352551 | 12/2002 |
| JP | 2004-039154 | 2/2004 |

OTHER PUBLICATIONS

English Language abstract of JP 2002-083481.
English Language abstract of JP 2002-343058.
English Language abstract of JP 2002-352551.
English Language abstract of JP 2004-039154.
U.S. Appl. No. 11/090,018, filed Mar. 28, 2005.
U.S. Appl. No. 11/138,276, filed May 27, 2005.
English language Abstract of JP 2002-100148, Apr. 5, 2002.

* cited by examiner

*Primary Examiner*—William A Rivera
(74) *Attorney, Agent, or Firm*—Greenblum & Bernstein, P.L.C.

(57) ABSTRACT

A cartridge case of an information recording medium includes a case main body where a guide part is disposed on an inner surface of a top plate, a tape reel that includes a hub in the shape of a bottomed-cylinder and is rotatably enclosed inside the case main body, and a locking member that is guided in a state where rotation is restricted by the guide part, is enclosed within the case main body so as to be capable of moving in a direction toward and away from a base plate of the hub, and restricts rotation of the tape reel. The guide part includes a cylindrical first convex part disposed on the inner surface and a plate-like second convex part disposed on the inner surface. The locking member includes a main part, a cylindrical third convex part that is disposed on the main part and engages the first convex part, and a plate-like fourth convex part that is disposed on the main part and contacts the second convex part to restrict rotation of the locking member.

6 Claims, 9 Drawing Sheets

PRIOR ART

FIG. 16

PRIOR ART

FIG. 17

PRIOR ART

CARTRIDGE CASE AND INFORMATION RECORDING MEDIUM

BACKGROUND OF THE INVENTION

1. Field of the Invention

The present invention relates to a cartridge case including a tape reel with a hub in the shape of a bottomed cylinder and a locking member that prevents rotation of the tape reel, and to an information recording medium equipped with the cartridge case.

2. Description of the Related Art

Figure 15:
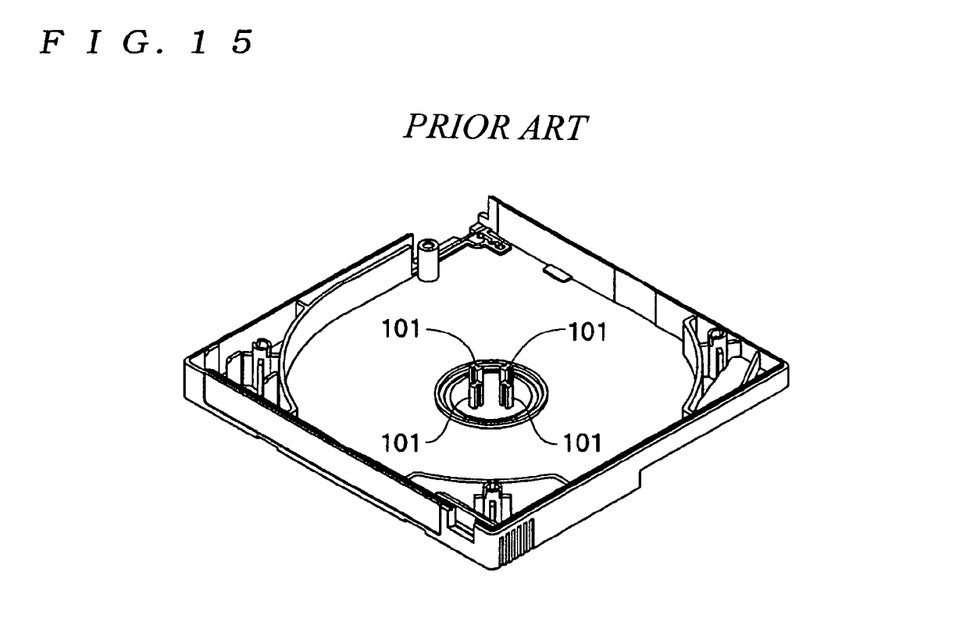
FIG. 15 is a perspective view of an upper case of a conventional tape cartridge.
Figure 16:
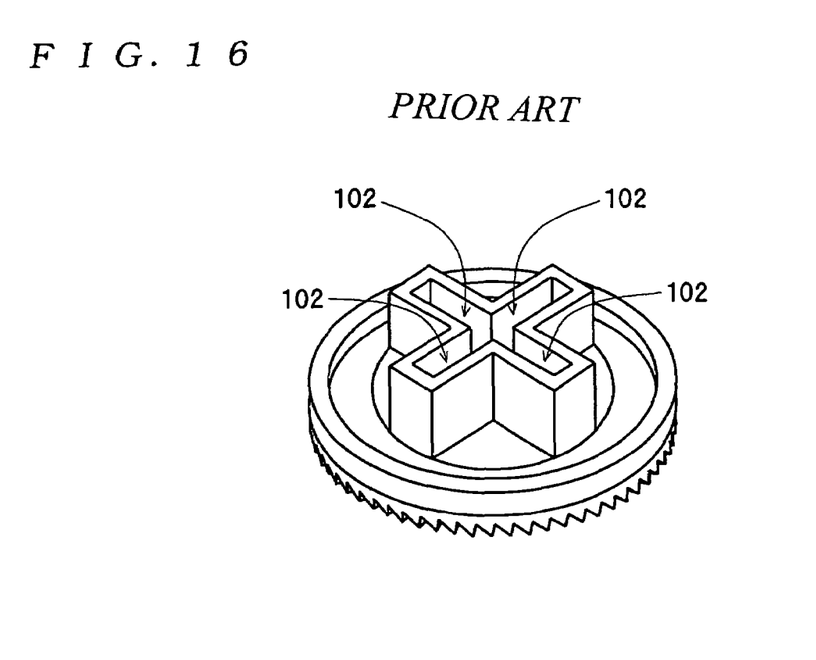
FIG. 16 is a perspective view of a locking member of the conventional tape cartridge.
Figure 17:
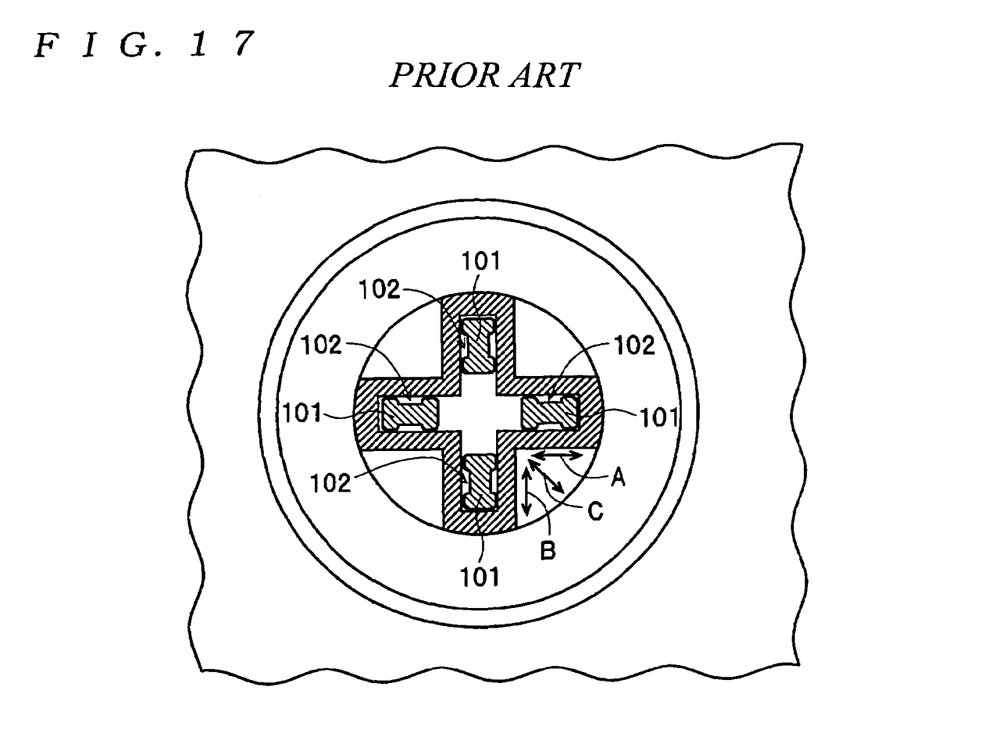
FIG. 17 is a cross-sectional view of guide protrusions and guide channels in the conventional tape cartridge in a state where the guide protrusions and the guide channels are in engagement.

In Japanese Laid-Open Patent Publication No. 2002-100148, the present applicant has disclosed a single reel-type tape cartridge as one example of this type of information recording medium. This tape cartridge is constructed by enclosing a single tape reel inside a main case so that the tape reel is rotatable. The tape reel, around which a tape is wound, has a hub in the shape of a bottomed cylinder, with engaging teeth being formed on an inner surface of the base plate of the hub. A brake lock that is energized by a brake spring and restricts rotation of the tape reel is also enclosed inside the main case. The brake lock is constructed so that teeth that engage the engaging teeth of the hub are formed on the lower surface of the brake lock and a guided protrusion that engages a positioning part provided on the inner surface of the upper case that constructs the main case is formed on an upper part of the brake lock. Here, as shown in FIG. 15, the positioning part of the main case (the upper case) is composed of four column-like guide protrusions 101. Also, as shown in FIG. 16, the guided protrusion of the brake lock is constructed so as to be shaped like a cross when viewed from above, with four guide channels 102 that are oblong when viewed from above and engage the respective guide protrusions 101 being formed in the shape of a cross. When this tape cartridge is not in use, as shown in FIG. 17, the brake lock is moved toward the base plate of the hub while being guided in a state where the guide protrusions 101 that respectively engage the guide channels 102 restrict rotation of the brake lock, so that the teeth of the brake lock and the engaging teeth of the hub engage one another. Accordingly, the tape reel is locked by the brake lock and the guide protrusions 101 in a state where rotation is prohibited. On the other hand, during use of the tape cartridge, by pressing up the brake lock with a brake releasing plate disposed between the base plate of the hub and the brake lock, the locking is released and rotation of the tape reel becomes possible.

By investigating the tape cartridge described above, the present inventors discovered the following problem to be solved. That is, with the above tape cartridge, by causing the guide protrusions 101 of the main case to engage the respective guide channels 102 of the brake lock, rotation of the brake lock is restricted and the brake lock is guided toward the base plate of the hub. That is, to make it possible for the brake lock to move smoothly, the dimensions of the guide protrusions 101 and the guide channels 102 are set so that a predetermined clearance is maintained between the guide protrusions 101 and the guide channels 102 when in engagement. However, as shown in FIGS. 15 to 17, since the shapes of the guide protrusions 101 and the guide channels 102 are complex, when a plurality of similar molds are used or when a multiple cavity mold is used to injection mold the main case and the brake lock, the dimensions of the guide protrusions 101 and the guide channels 102 fluctuate between individual molds or individual cavities. Accordingly, there can be fluctuations in the respective clearances between the guide protrusions 101 and the guide channels 102.

Also, as shown in FIG. 17, since the tape cartridge uses a construction where the four column-shaped guide protrusions 101 engage the four oblong guide channels 102 when viewed from above, by rotating the brake lock by 90° to change the orientation with respect to the main case when the guide protrusions 101 and the guide channels 102 are brought into engagement, it is possible to have any of the guide protrusions 101 engage any of the guide channels 102. This means that when there are fluctuations in the dimensions of the respective guide protrusions 101 and the respective guide channels 102, the clearances between the guide protrusions 101 and the respective guide channels 102 can fluctuate even more depending on the orientation of the brake lock with respect to the main case when the guide protrusions 101 and the guide channels 102 are brought into engagement. Accordingly, the brake lock can become slightly inclined with respect to the inner surface of the main case (upper case) due to such fluctuations in the clearance. Also, due to its construction, the tape cartridge has a characteristic whereby even if the respective clearances between the guide protrusions 101 and the guide channels 102 are all identical, the brake lock will be slightly more inclined with respect to the inner surface of the main case in directions (for example, the direction shown by the arrow C in FIG. 17) at an angle of 45°, for example, to the lengthwise directions of the guide channels 102 (i.e., the directions shown by the arrows A and B in FIG. 17) than in the lengthwise directions of the guide channels 102. Accordingly, with this tape cartridge, due to this characteristic and the brake lock becoming inclined due to the fluctuations in clearance described above, there is the risk of the hub contacting the brake lock and producing abnormal noise.

Also, due to the fluctuations in the clearance described above, when the tape reel is rotating in a state where the brake releasing plate presses up the brake lock, there are cases when there is misalignment between the central axis of the brake releasing plate that rotates together with the tape reel and the central axis of the brake lock. When such misalignment occurs, the brake lock vibrates due to a force that moves the brake lock toward the outer periphery and a force whereby a brake spring attempts to restore the brake lock to its original position, resulting in the risk of abnormal noise.

SUMMARY OF THE INVENTION

The present invention was conceived in view of the problems described above and it is a principal object of the present invention to provide a cartridge case and an information recording medium that can reliably prevent the production of abnormal noise due to contact between the locking member and the hub and the production of abnormal noise due to vibration of the locking member.

To achieve the stated object, a cartridge case according to the present invention includes: a case main body where a guide part is disposed on an inner surface of a top plate; a tape reel that includes a hub in the shape of a bottomed-cylinder and is rotatably enclosed inside the case main body; and a locking member that is guided in a state where rotation is restricted by the guide part, is enclosed within the case main body so as to be capable of moving in a direction toward and away from a base plate of the hub, and restricts rotation of the tape reel, wherein the guide part includes a cylindrical first convex part disposed on the inner surface and a plate-like second convex part disposed on the inner surface, and the locking member includes a main part, a cylindrical third convex part that is disposed on the main part and engages the first convex part, and a plate-like fourth convex part that is disposed on the main part and contacts the second convex part to restrict rotation of the locking member. An information recording medium according to the present invention includes this cartridge case.

In this cartridge case and the information recording medium, the guide part includes the cylindrical first convex part and the plate-like second convex part and the locking member includes a cylindrical third convex part that engages the first convex part and a fourth convex part that contacts the second convex part to restrict rotation of the locking member. Since it is possible to form the respective convex parts (the guide part and the locking member) with simple shapes, it is possible to fabricate the molds for injection molding with high precision. Also, since the shapes are simple, there are few parts that affect the clearances between the convex parts, that is, there are few parts whose dimensions should be managed when injection molding the case main body and the locking member, and as a result, it is possible to reliably and easily manage the molding conditions. Accordingly, since it is possible to suppress fluctuations in the dimensions of the respective convex parts to a tiny amount, it is possible to keep the clearances between the respective convex parts in an engaging state at substantially the set values. Also, since the first convex part and the second convex part are respectively formed with cylindrical shapes, the clearance between the outer circumferential surface of the first convex part and the inner circumferential surface of the second convex part can be made substantially equal at all positions. Accordingly, the inclination of the locking member with respect to the top plate of the case main body can be suppressed to a tiny amount in all directions, and as a result, the production of abnormal noise due to contact between the locking member and the hub due to inclination of the locking member can be reliably prevented. Also, since misalignment of the locking member and the brake releasing plate for releasing the locking by the locking member can be suppressed to a tiny amount, it is possible to reliably prevent the production of abnormal noise due to vibration of the locking member that is caused by misalignment of the locking member and the brake releasing plate.

Here, the second convex part may be composed of a single plate-like member erected inside the first convex part on the inner surface, and the fourth convex part may be composed of a pair of plate-like members that are erected so as to face one another at a predetermined distance inside the third convex part on the main part with a gap formed by the pair of plate-like members engaging the second convex part. With this construction, it is possible to cause the second convex part to reliably and easily engage the gap produced by the plate-like members of the fourth convex part and to reliably restrict rotation of the locking member.

Here, the second convex part may be composed of a pair of plate-like members erected inside the first convex part on the inner surface so as to face one another at a predetermined distance, and the fourth convex part may be composed of a single plate-like member that is erected inside the third convex part on the main part and engages a gap formed by the pair of plate-like members. With this construction, it is possible to cause the fourth convex part to reliably and easily engage the gap produced by the plate-like members of the second convex part and to reliably restrict rotation of the locking member.

It should be noted that the disclosure of the present invention relates to a content of Japanese Patent Application 2004-192732 that was filed on 30 Jun. 2004 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a cartridge case and an information recording medium according to the present invention will now be described with reference to the attached drawings.

First, the construction of a tape cartridge 1 (one example of an information recording medium according to the present invention) will be described with reference to the drawings.

Figure 1:
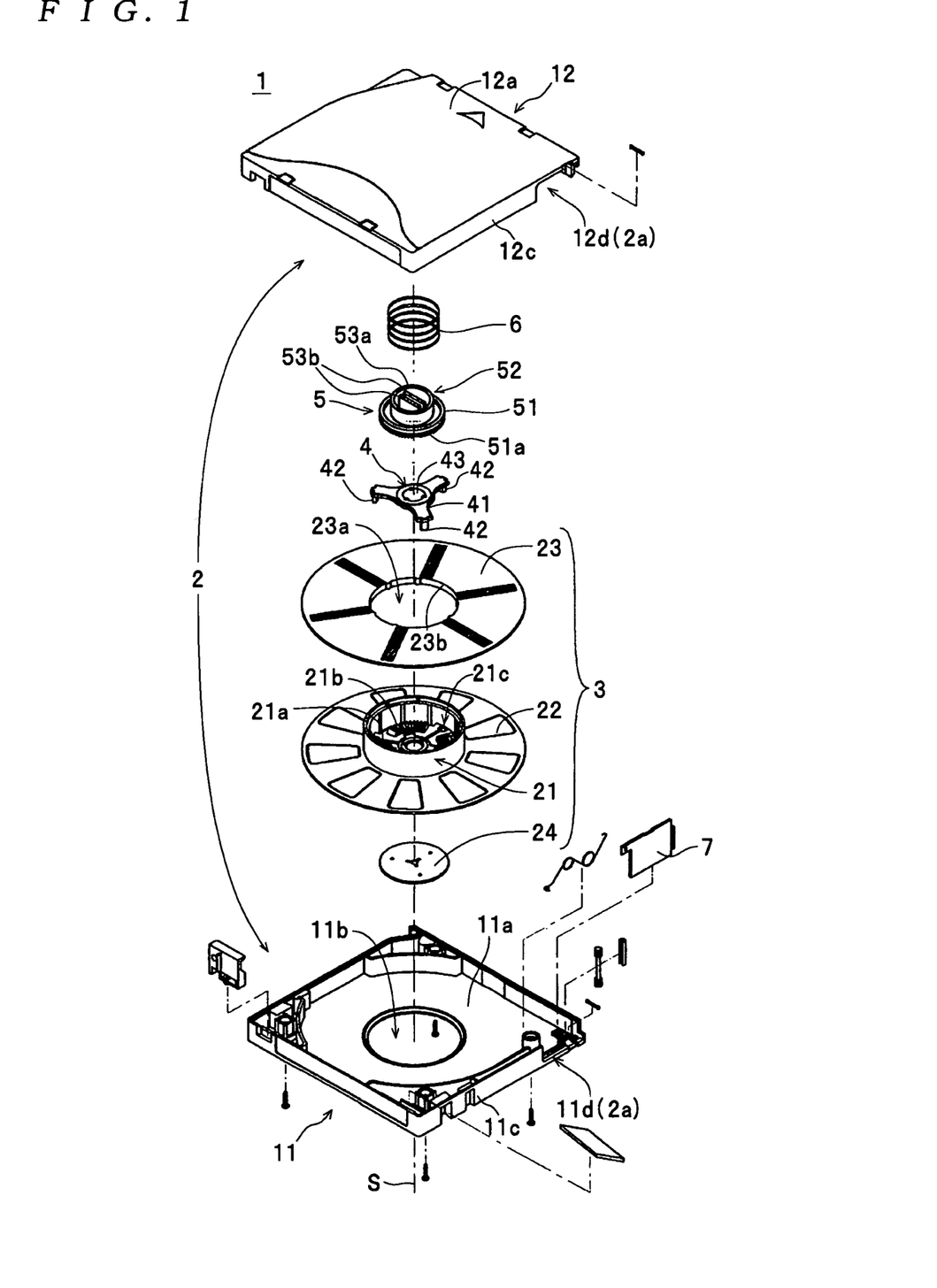
FIG. 1 is an exploded perspective view of a tape cartridge.

The tape cartridge 1 shown in FIG. 1 is a single-reel, cartridge-type information recording medium that is used as a storage device for backing-up recording data that has been recorded by a computer, for example. As shown in FIG. 1, tape cartridge 1 includes a case main body 2, a tape reel 3, a brake releasing plate 4, a locking member 5, a spring 6, and a door member 7. A magnetic tape, not shown, is wound around the tape reel 3. Here, the component elements aside from the magnetic tape construct the cartridge case according to the present invention.

As shown in FIG. 1, the case main body 2 is constructed of a lower case 11 and an upper case 12 that are respectively formed in the shape of shallow plates and can engage one another. The case main body 2 encloses the tape reel 3 in an internal space formed when the lower case 11 and the upper case 12 engage one another so that the tape reel 3 is rotatable. Here, a circular opening 11b for allowing a drive shaft of a drive apparatus, not shown, to pass through is formed in a central part of a base plate 11a of the lower case 11. A cutaway part lid which constructs a tape withdrawal opening 2a for withdrawing the magnetic tape wound around the tape reel 3 to the outside is formed in a side wall 11c of the lower case 11.

Figure 2:
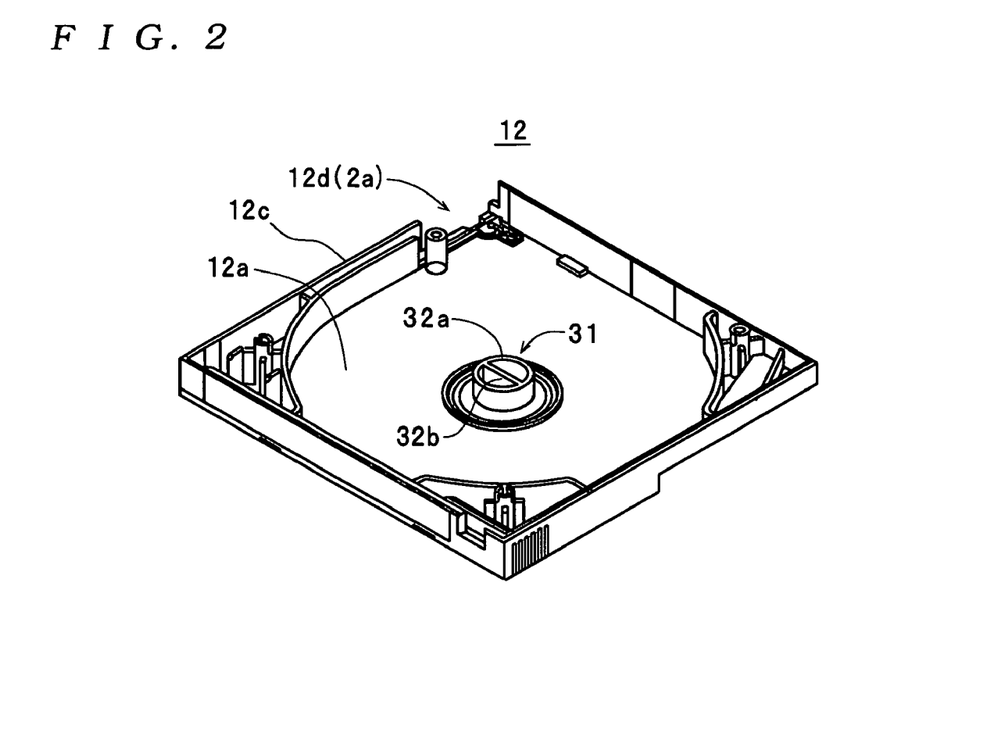
FIG. 2 is a perspective view of an upper case.
Figure 10:
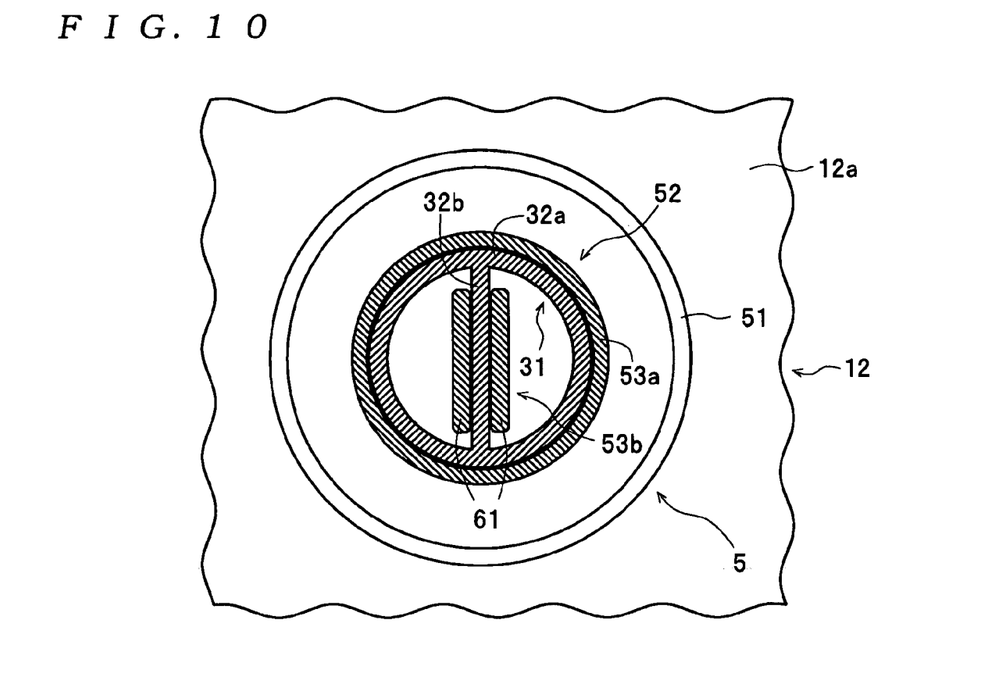
FIG. 10 is a cross-sectional view of a guide part and a guided part.

On the other hand, as shown in FIG. 2, a guide part 31, which restricts rotation of the locking member 5 and guides the locking member 5 in a direction toward and away from a base plate 21a (see FIG. 1) of a hub 21 of the tape reel 3, is disposed on an inner surface of a top plate 12a of the upper case 12. As shown in FIG. 2 and in FIG. 10, the guide part 31 is constructed of a cylindrical convex part 32a (corresponding to a "first convex part" for the present invention) that is erected on a central part of the inner surface of the top plate 12a and a convex part 32b (corresponding to a "second convex part" for the present invention) that is composed of a single plate-like member and is erected inside the convex part 32a on the top plate 12a. Here, as shown in FIG. 10, the convex part 32b is connected to the convex part 32a at both ends thereof. Both convex parts 32a, 32b are formed so as to be integrated with the upper case 12 during molding. In addition, a cutaway part 12d that together with the cutaway part lid of the lower case 11 constructs the tape withdrawal opening 2a is formed in a side wall 12c of the upper case 12.

Figure 3:
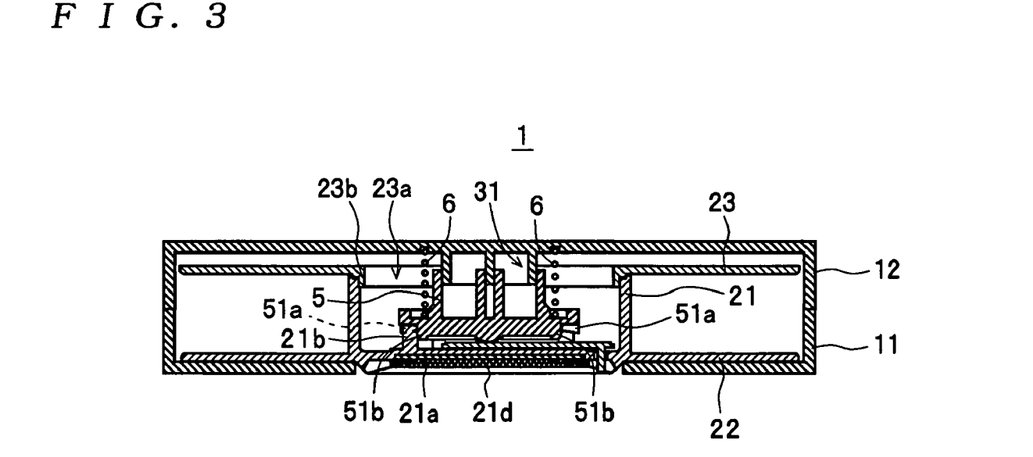
FIG. 3 is a cross-sectional view of the tape cartridge.
Figure 4:
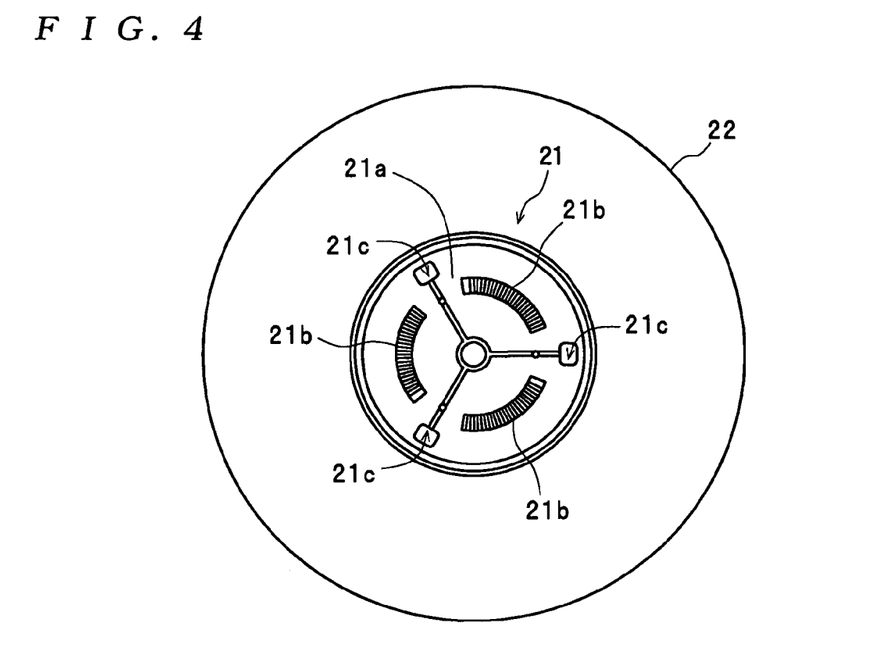
FIG. 4 is a plan view of a hub and a lower flange.
Figure 5:
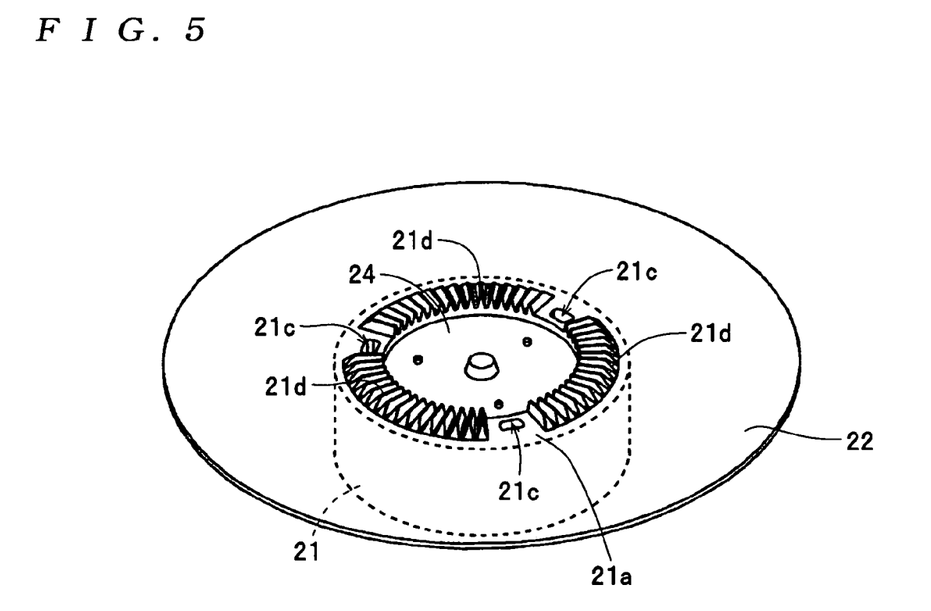
FIG. 5 is a perspective view of a hub and a lower flange.

As shown in FIG. 1, the tape reel 3 includes a hub 21, a lower flange 22, and an upper flange 23. The hub 21 is shaped as a bottomed cylinder where an opening is formed at an upper end, and is constructed so that the magnetic tape can be wound around a circumference thereof. Also, as shown in FIGS. 3 and 4, sets of arc-shaped teeth 21b (when viewed from above) that engage teeth 51a of the locking member 5 energized by the spring 6 are formed on a circle about an axis S (see FIG. 1) of the hub 21 on an inner surface of the base plate 21a of the hub 21. Also, as shown in FIG. 4, insertion through-holes 21c for attaching the brake releasing plate 4 (see FIG. 1) in a state where the brake releasing plate 4 can move up and down are formed on a circle about the axis S of the hub 21 in the base plate 21a of the hub 21. In addition, as shown in FIG. 5, a metal plate 24 (see FIG. 1) for attaching the drive shaft of a drive apparatus and the hub 21 (the tape reel 3) by magnetic attraction is also attached to a central part of an outer surface of the base plate 21a of the hub 21. Also, as shown in FIG. 5, ring-shaped teeth 21d that engage driving teeth (not shown) of the drive shaft of the drive apparatus are formed on the outer surface of the base plate 21a so as to surround the metal plate 24.

As shown in FIGS. 4 and 5, the lower flange 22 is disc-like and is integrally formed at a lower end of the hub 21. As shown in FIGS. 1 and 3, the upper flange 23 is also disc-like, and is fixed to the hub 21 by ultrasonic welding, for example, in a state where a ring-like protrusion 23b formed at the rim of a circular center hole 23a has been fitted into the opening of the hub 21.

As shown in FIG. 1, the brake releasing plate 4 includes a main body 41, three legs 42 that are erected on the rear surface (the lower surface in FIG. 1) of the main body 41 and are formed so as to be able to pass through the insertion through-holes 21c of the hub 21, and a circular metal plate 43 that is attached to a center of the surface (the upper surface in FIG. 1) of the main body 41. By respectively inserting the legs 42 into the insertion through-holes 21c of the hub 21, the brake releasing plate 4 is disposed on the base plate 21a inside the hub 21 so as to be incapable of rotation relative to the hub 21 but capable of up-down movement.

Figure 6:
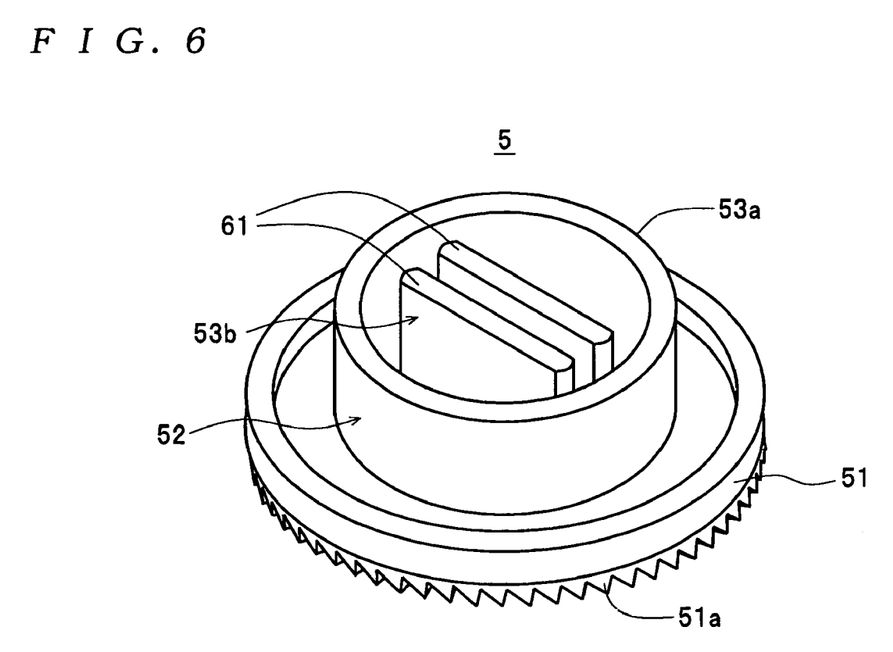
FIG. 6 is a perspective view of a locking member shown from above.
Figure 7:
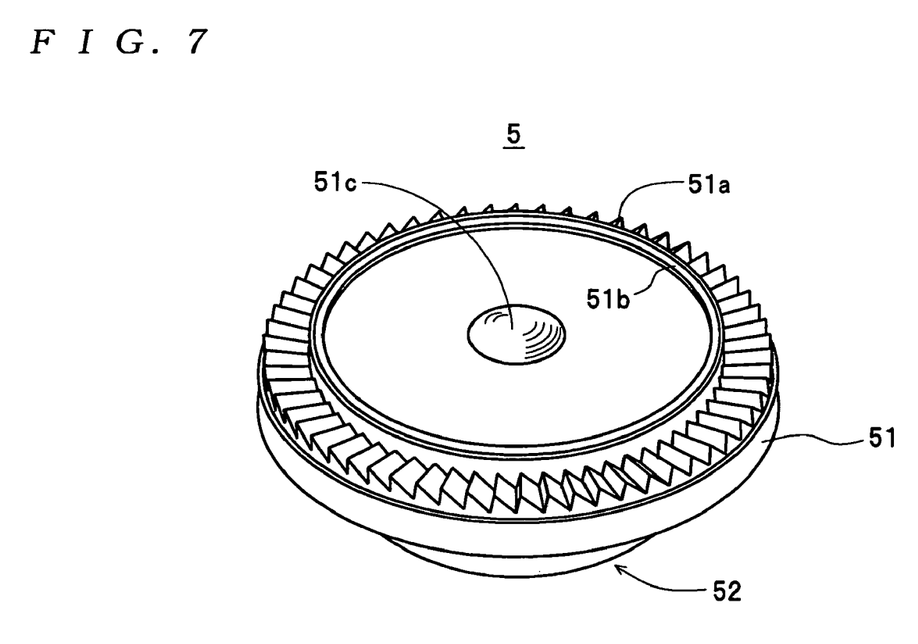
FIG. 7 is a perspective view of a locking member shown from below.
Figure 8:
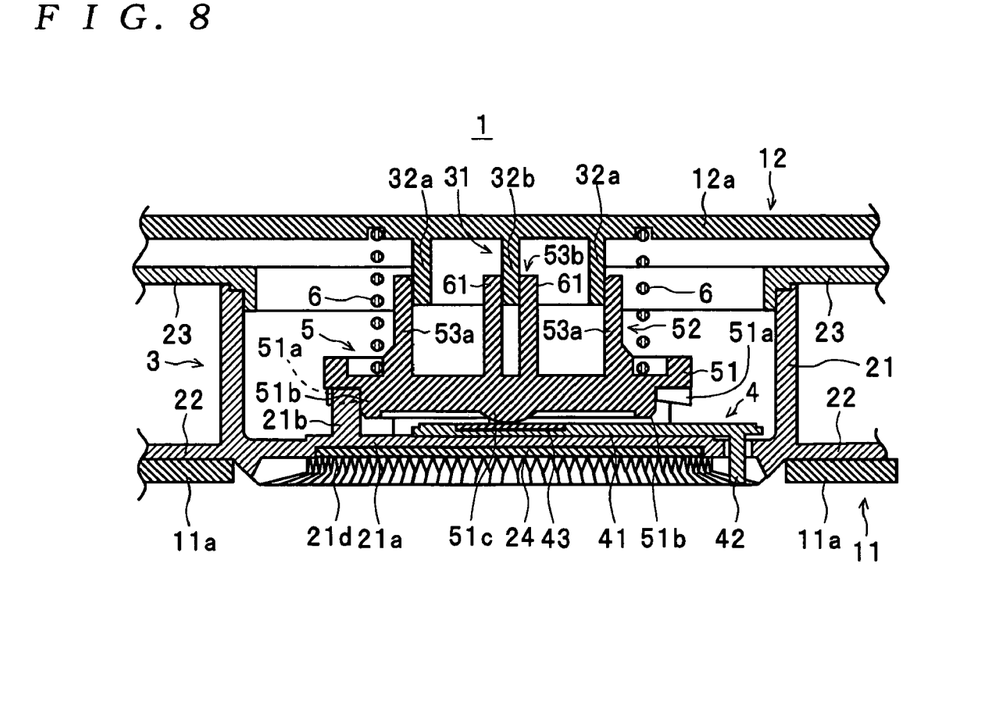
FIG. 8 is a cross-sectional view of the tape cartridge when not in use.

As shown in FIGS. 1 and 6, the locking member 5 includes a main body 51 and a guided part 52 and is enclosed (inside the hub 21) inside the case main body 2. The main body 51 is disc-like and, as shown in FIG. 7, has ring-like teeth 51a (when viewed from above) that can engage the teeth 21b of the hub 21 formed on the outer edge of the lower surface (the upper surface in FIG. 7) of the main body 51. A ring-shaped positioning part 51b is also formed on an inner circumference side of the teeth 51a of the main body 51. The protruding height of the positioning part 51b is set greater than the height of the teeth 51a. Also, the outer diameter of the positioning part 51b is set so that in a state where the teeth 21b and the teeth 51a are in engagement, the positioning part 51b is engaged with the tape reel 3 on an inner peripheral side of the sets of teeth 21b. Also, as shown in FIGS. 7 and 8, a protrusion 51c for contacting the metal plate 43 of the brake releasing plate 4 during rotation of the tape reel 3 and reducing frictional resistance between the locking member 5 and the metal plate 43 is formed in the center of the base surface of the main body 51.

As shown in FIGS. 6 and 10, the guided part 52 includes a convex part 53a (corresponding to a "third convex part" for the present invention) and a convex part 53b (corresponding to a "fourth convex part" for the present invention). The convex part 53a is cylindrical and is erected on an upper part of the main body 51. The convex part 53a is set so that an inner diameter thereof is slightly larger than an outer diameter of the convex part 32a of the upper case 12. That is, the convex part 53a is constructed so as to engage the convex part 32a of the upper case 12 on the outside of the convex part 32a with a predetermined clearance. The convex part 53b is composed of a pair of plate-like members 61 that are erected inside the convex part 53a on the upper part of the main body 51. Here, the plate-like members 61 are erected so as to face one another at a distance (one example of a "predetermined distance" for the present invention) that is slightly larger than the thickness of the convex part 32b of the upper case 12. That is, the convex part 53b is constructed so that the gap formed by the plate-like members 61 is engaged by the convex part 32b of the upper case 12 with a predetermined clearance. Here, the clearance between the convex part 53a and the convex part 32a and the clearance between the convex part 53b and the convex part 32b are set at values that allow smooth movement of the locking member 5 without rattling.

When the tape cartridge 1 is not in use, the convex part 32b of the guide part 31 engages the gap formed between the plate-like members 61 and the facing side walls of the plate-like members 61 contact the side walls of the convex part 32b, thereby restricting rotation of the locking member 5. The locking member 5 in this state is energized by the spring 6 and the teeth 51a are caused to engage the teeth 21b of the hub 21. By doing so, rotation of the tape reel 3 is restricted. Here, the locking member 5 and the upper case 12 (the case main body 2) described above are manufactured by injection molding resin. Since the guided part 52 and the guide part 31 are constructed of cylindrical and plate-like members with simple shapes, it is possible to fabricate the molds for injection molding with high precision. This means that when a plurality of molds are fabricated or when molds with a multiple-cavity construction are used, the differences in dimensions between individual molds and individual cavities can be suppressed to tiny amounts. Also, since the shapes are simple, there are few positions that affect the clearance between the guide part 31 and the guided part 52, that is, there are few parts whose dimensions need to be controlled when injection molding the upper case 12 and the locking member 5, and as a result the molding conditions can be controlled easily and reliably. Since it is possible to suppress the fluctuations in the dimensions of the guide part 31 and the guided part 52 to tiny amounts, as shown in FIG. 10, a clearance of substantially the set value is maintained between the guide part 31 and the guided part 52 in the engaged state.

As shown in FIG. 1, the spring 6 is composed of a coil spring, is disposed between the upper case 12 and the locking member 5, and energizes the locking member 5 toward the base plate 21a of the hub 21 of the tape reel 3. As shown in FIG. 1, the door member 7 is formed of a thin plate that can close the tape withdrawal opening 2a and is enclosed in guide channels respectively formed in the side wall 11c of the lower case 11 and the side wall 12c of the upper case 12 so as to be able to slide.

Next, the operation of the various component elements when the tape cartridge 1 is used will be described with reference to the drawings.

In a state where the tape cartridge 1 has been ejected from a drive apparatus, not shown, that is, when the tape cartridge 1 is not in use, as shown in FIG. 8 the locking member 5 is energized by the spring 6 and is moved toward the base plate 21a of the hub 21 while pressing the brake releasing plate 4. At this time, the teeth 51a of the locking member 5 engage the teeth 21b of the hub 21. Rotation of the locking member 5 is restricted by the convex part 32b of the guide part 31 of the upper case 12 that engages the convex part 53b of the guided part 52. For this reason, rotation of the hub 21 (the tape reel 3) is prevented by the locking member 5, rotation of which is prevented by the convex part 32b. As a result, slackening of the magnetic tape (not shown) wound around the tape reel 3 is prevented. Also, in this state, as shown in FIG. 8, the positioning part 51b of the locking member 5 is engaged with the tape reel 3 on the inner peripheral side of the teeth 21b. The clearance between the convex part 32a and the convex part 53a and the clearance between the convex part 32b and the convex part 53b of the guide part 31 and the guided part 52 that are in engagement are respectively kept at substantially the set values. This means that rattling of the locking member 5 is prevented. Accordingly, movement of the hub 21 relative to the locking member 5 in any direction on a plane perpendicular to the axis S (see FIG. 1) of the hub 21 is prevented. Also, as shown in FIG. 10, since the convex part 32a and the convex part 53a are respectively formed of cylindrical shapes, the clearance between the outer circumferential surface of the convex part 32a and the inner circumferential surface of the convex part 53a will be the same at any position, and as a result, inclination of the locking member 5 with respect to the top plate 12a of the upper case 12 and rattling of the locking member 5 are reliably prevented.

Figure 9:
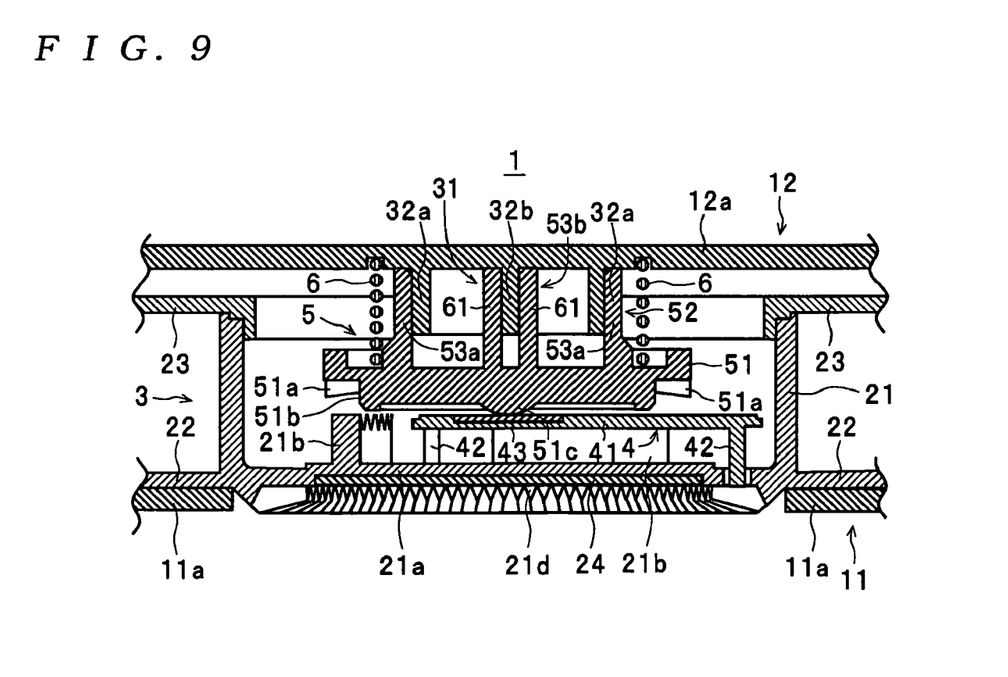
FIG. 9 is a cross-sectional view of the tape cartridge during use.

On the other hand, when the tape cartridge 1 is loaded into a loading unit of a drive apparatus, the door member 7 is slid by the drive apparatus to open the tape withdrawal opening 2a. Next, for example, the loading unit moves the tape cartridge 1 toward the front end of the driving shaft inside the drive apparatus, so that as shown in FIG. 9, the legs 42 of the brake releasing plate 4 are pressed by the drive shaft (not shown). As a result, the locking member 5 is pressed in toward the top plate 12a of the upper case 12 by the brake releasing plate 4 while being guided by the guide part 31 of the upper case 12. Here, since the clearances between the convex part 32a and the convex part 53a and between the convex part 32b and the convex part 53b are respectively kept at substantially the set values, the locking member 5 moves smoothly toward the top plate 12a. Such movement releases the engagement of the teeth 51a on the locking member 5 and the teeth 21b on the hub 21 and releases the engagement of the positioning part 51b and the cylindrical shape formed by the teeth 21b. Next, the driving teeth (not shown) disposed on the front end of the drive shaft and the teeth 21d of the hub 21 engage and the metal plate 24 of the tape reel 3 is attached to the front end of the drive shaft by magnetic attraction, thereby chucking the drive shaft and the tape reel 3.

Next, the drive apparatus pulls the magnetic tape wound around the tape reel 3 out of the case main body 2 from the tape withdrawal opening 2a. While a tape reel inside the drive apparatus winds the magnetic tape, the drive shaft of the drive apparatus rotates at a rotational velocity in accordance with the withdrawal velocity of the magnetic tape and thereby rotates the tape reel 3. Since the clearance between the convex part 32a and the convex part 53a and the clearance between the convex part 32b and the convex part 53b are respectively kept at substantially the set values and the clearance between the convex part 32b and the convex part 53b is the same at any position, inclination of the locking member 5 to the top plate 12a of the upper case 12 is suppressed to a tiny amount in every direction, so that the production of abnormal noise due to contact between the locking member 5 and the hub 21 is reliably prevented. Since misalignment of the locking member 5 and the brake releasing plate 4 is suppressed to a tiny amount, the production of abnormal noise due to vibration of the locking member 5 is reliably prevented. Next, a recording/reproduction unit of the drive apparatus carries out the recording of recording data on the magnetic tape or the reading of recording data from the magnetic tape. After this, once the recording and/or reading of recording data has/have ended, the drive shaft rotates in a rewinding direction for the magnetic tape, thereby rewinding the magnetic tape onto the tape reel 3.

Next, when the winding of the magnetic tape has ended, the loading unit withdraws the front end of the drive shaft from the tape cartridge 1. In this case, the locking member 5 energized by the spring 6 presses the brake releasing plate 4 while being moved toward the base plate 21a of the hub 21. Since the clearance between the convex part 32a and the convex part 53a and the clearance between the convex part 32b and the convex part 53b are respectively kept at substantially the set values, the locking member 5 moves smoothly. Next, the positioning part 51b of the locking member 5 is engaged with the tape reel 3 on the inner peripheral side of the teeth 21b of the hub 21. Accordingly, the hub 21 and the locking member 5 are positioned relative to one another. After this, the teeth 51a of the locking member 5 and the teeth 21b of the hub 21 engage. Here, the teeth 21b and the positioning part 51b reliably engage since the hub 21 and the locking member 5 are positioned relative to one another by the positioning part 51b engaging the tape reel 3 on the inner peripheral side of the teeth 21b. Since the clearance between the outer circumferential surface of the convex part 32a and the inner circumferential surface of the convex part 53a is the same at any position in the same way as when the tape cartridge 1 is not in use, inclination of the locking member 5 with respect to the top plate 12a of the upper case 12 and rattling of the locking member 5 are reliably prevented. By doing so, rotation of the hub 21 (the tape reel 3) is restricted and slackening of the magnetic tape wound around the tape reel 3 is reliably prevented.

In this way, according to the tape cartridge 1, the guide part 31 is constructed of the cylindrical convex part 32a and the plate-like convex part 32b and the guided part 52 is constructed of the cylindrical convex part 53a that engages the convex part 32a and the convex part 53b whose side walls contact the side walls of the convex part 32b and restrict the rotation of the locking member 5, and therefore the guide part 31 and the guided part 52 can be formed of simple shapes. Accordingly, the molds used for injection molding can be fabricated with high precision. Since the shapes are simple, there are few positions that affect the clearance between the guide part 31 and the guided part 52, that is, there are few positions whose dimensions should be managed when injection molding the upper case 12 and the locking member 5, and as a result the molding conditions can be managed easily and reliably. Since it is possible to suppress the fluctuations in the dimensions of the guide part 31 and the guided part 52 to tiny amounts, a clearance of substantially the set value can be maintained between the guide part 31 and the guided part 52 in the engaged state. By respectively forming the convex part 32*a* and the convex part 53*a* in cylindrical shapes, the clearance between the outer circumferential surface of the convex part 32*a* and the inner circumferential surface of the convex part 53*a* can be kept substantially equal at all positions. Accordingly, since it is possible to suppress the inclination of the locking member 5 with respect to the top plate 12*a* of the upper case 12 in all directions to a tiny amount, it is possible to reliably prevent the production of abnormal noise due to contact between the locking member 5 and the hub 21 due to inclination of the locking member 5. Since the displacement of the locking member 5 and the brake releasing plate 4 can be suppressed to a tiny amount, it is possible to prevent the production of abnormal noise due to vibration of the locking member 5 caused by displacement of the locking member 5 and the brake releasing plate 4.

Also, by constructing the convex part 53*b* of a pair of plate-like members 61, it is possible to reliably and easily cause the convex part 32*b* to engage the gap between the plate-like members 61 so that rotation of the locking member 5 can be reliably restricted.

Figure 11:
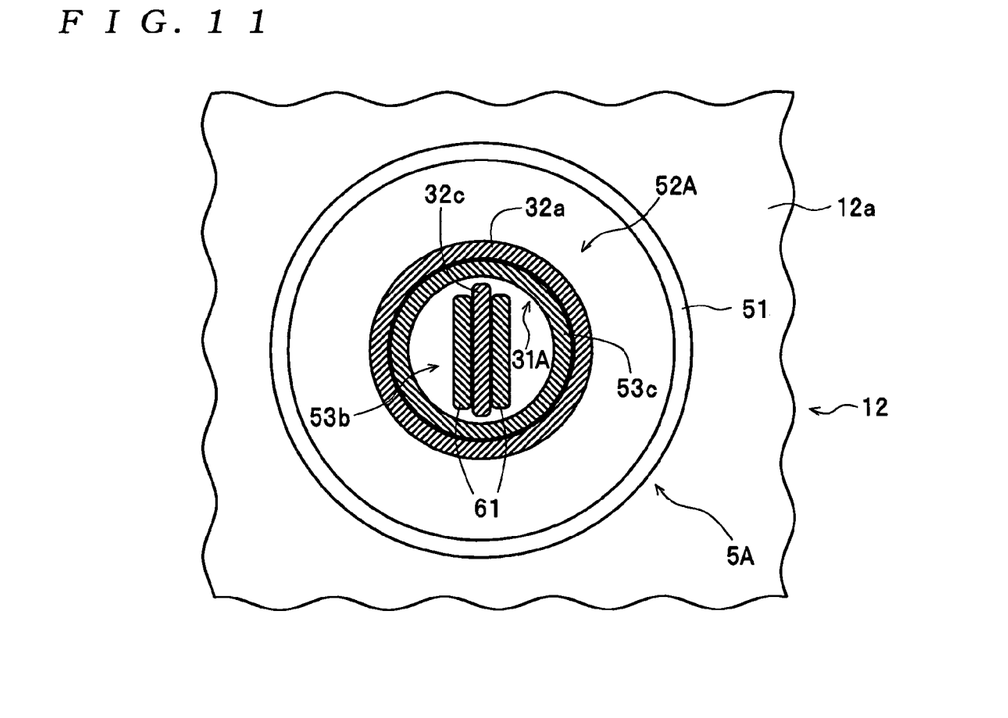
FIG. 11 is a cross-sectional view of another guide part and another guided part.
Figure 12:
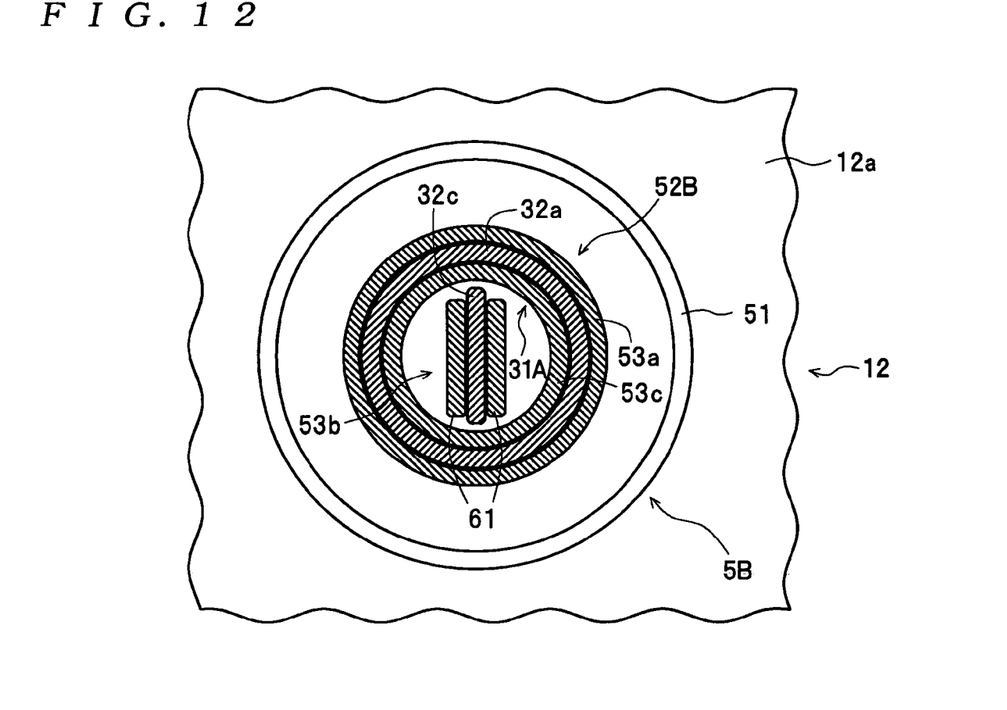
FIG. 12 is a cross-sectional view of another guide part and another guided part.

It should be noted that the present invention is not limited to the above embodiment. For example, although an example where the guide part 31 is constructed so that both ends of the convex part 32*b* are connected to the convex part 32*a* and the locking member 5 includes the convex part 53*a* that engages the convex part 32*a* on the outside of the convex part 32*a* has been described, as shown in FIG. 11, in place of the guide part 31 and the locking member 5, it is possible to use a guide part 31A, where both ends of a convex part 32*c* (corresponding to the "second convex part" for the present invention) are separate from the convex part 32*a*, and a locking member 5A including a convex part 53*c* (corresponding to the "third convex part" for the present invention) that engages the convex part 32*a* on an inside of the convex part 32*a*. It should be noted that in FIGS. 11 to 14, parts with the same functions as the component elements of the upper case 12 and the locking member 5 are designated by the same reference numerals and description thereof is omitted. Also, as shown in FIG. 12, in place of the guide part 31 and the locking member 5, it is possible to use the guide part 31A described above and a locking member 5B including a guided part 52B with both the convex parts 53*a* and 53*c*. With the tape cartridge (the information recording medium) including the guide part 31A and the locking member 5A and the tape cartridge including the guide part 31A and the locking member 5B, the production of abnormal noise due to contact between the locking member 5 and the hub 21 due to inclination of the locking member 5 and the production of abnormal noise due to vibration of the locking member 5 due to displacement of the locking member 5 and the brake releasing plate 4 can be reliably prevented in the same way as with the tape cartridge 1.

Figure 13:
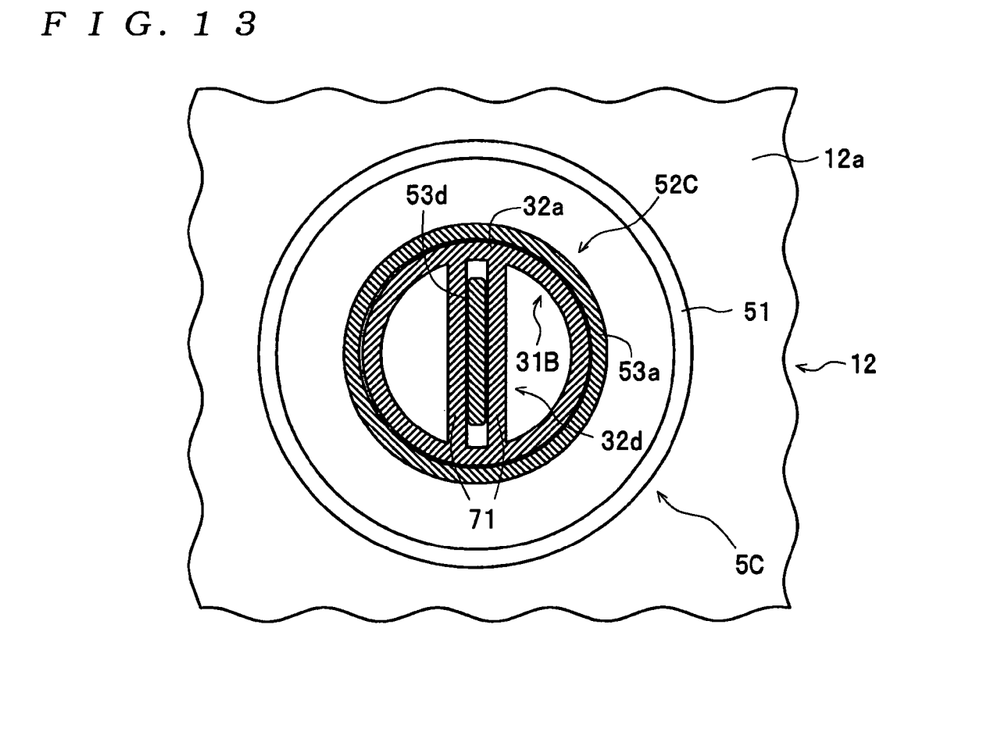
FIG. 13 is a cross-sectional view of another guide part and another guided part.
Figure 14:
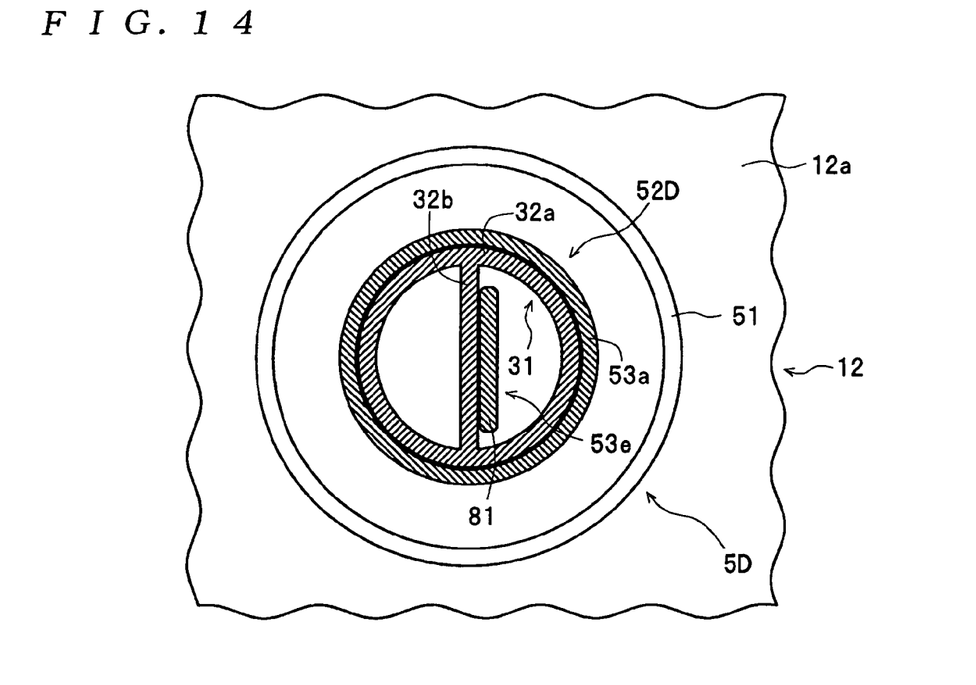
FIG. 14 is a cross-sectional view of the guide part and another guided part.

Also, as shown in FIG. 13, in place of the guide part 31 and the locking member 5, it is possible to use a guide part 31B and a locking member 5C including a guided part 52C. The guide part 31B includes the convex part 32*a* and a convex part 32*d* (corresponding to the "second convex part" for the present invention) that is composed of a pair of plate-like members 71 that are erected on the inside of the convex part 32*a* so as to face each other a predetermined distance apart. The guided part 52C includes the convex part 53*a* and a convex part 53*d* (corresponding to the "fourth part" for the present invention) composed of a single plate-like member that engages the gap formed by the plate-like members 71 erected inside the convex part 53*a*. In this tape cartridge including the guide part 31B and the locking member 5C, rotation of the locking member 5C can be reliably restricted in the same way as in the tape cartridge 1. In addition, as shown in FIG. 14, in place of the locking member 5, it is possible to use a locking member 5D including a guided part 52D. The guided part 52D includes the convex part 53*a* and a convex part 53*e* (corresponding to the "fourth convex part" for the present invention) composed of a single plate-like member 81 whose side wall contacts a side wall of the convex part 32*b* of the guide part 31 erected inside the convex part 53*a*. With this tape cartridge including the locking member 5D, the same effects as the tape cartridge 1 and the various tape cartridges described above can be realized.

What is claimed is:

1. A cartridge case comprising:
   a case main body where a guide part is disposed on an inner surface of a top plate;
   a tape reel that includes a hub in the shape of a bottomed-cylinder and is rotatably enclosed inside the case main body; and
   a locking member that is guided in a state where rotation is restricted by the guide part, is enclosed within the case main body so as to be capable of moving in a direction toward and away from a base plate of the hub, and restricts rotation of the tape reel,
   wherein the guide part includes a cylindrical first part erected on the inner surface of the top plate, and a plate-like second part erected on the inner surface of the top plate, and
   the locking member includes a main part, a cylindrical third part that is erected on the main part and engages the first part in a state where a peripheral wall of the first part and a peripheral wall of the third part face each other, and a plate-like fourth part that is erected on the main part and contacts the second part to restrict rotation of the locking member.

2. A cartridge case according to claim 1,
   wherein the second part is composed of a single plate-like member erected inside the first part on the inner surface of the top plate, and
   the fourth part is composed of a pair of plate-like members that are erected so as to face one another at a predetermined distance inside the third part on the main part with a gap formed by the pair of plate-like members engaging the second part.

3. An information recording medium comprising a cartridge case according to claim 2.

4. A cartridge case according to claim 1,
   wherein the second convex part is composed of a pair of plate-like members erected inside the first convex part on the inner surface so as to face one another at a predetermined distance, and
   the fourth convex part is composed of a single plate-like member that is erected inside the third convex part on the main part and engages a gap formed by the pair of plate-like members.

5. An information recording medium comprising a cartridge case according to claim 4.

6. An information recording medium comprising a cartridge case according to claim 1.

* * * * *